(12) United States Patent
Pizzichil

(10) Patent No.: US 7,336,013 B2
(45) Date of Patent: Feb. 26, 2008

(54) HIGH MECHANICAL STRENGTH ELECTRICAL CONNECTION SYSTEM AND METHOD

(75) Inventor: William P. Pizzichil, Easley, SC (US)

(73) Assignee: Reliance Electric Technologies, LLC, Mayfield Heights, OH (US)

( * ) Notice: Subject to any disclaimer, the term of this patent is extended or adjusted under 35 U.S.C. 154(b) by 357 days.

(21) Appl. No.: 10/955,680

(22) Filed: Sep. 30, 2004

(65) Prior Publication Data

US 2006/0066158 A1     Mar. 30, 2006

(51) Int. Cl.
*H02K 17/16* (2006.01)
(52) U.S. Cl. ........................ 310/211; 310/183
(58) Field of Classification Search ........ 310/210–212, 310/183, 156.78, 270
See application file for complete search history.

(56) References Cited

U.S. PATENT DOCUMENTS

| | | | | |
|---|---|---|---|---|
| 729,449 | A * | 5/1903 | Thomson | 310/211 |
| 1,375,461 | A * | 4/1921 | Kimble | 310/211 |
| 1,506,753 | A * | 9/1924 | Hoey | 310/211 |
| 1,719,829 | A * | 7/1929 | Bunker | 164/94 |
| 1,722,984 | A * | 7/1929 | Ferris | 210/179 |
| 1,751,559 | A * | 3/1930 | Schou | 310/183 |
| 1,921,140 | A * | 8/1933 | Smith | 310/63 |
| 2,470,767 | A * | 5/1949 | Ellis | 318/830 |
| RE23,460 | E * | 2/1952 | Felici | 310/309 |
| 2,767,340 | A * | 10/1956 | Martiny | 310/212 |
| 2,991,378 | A * | 7/1961 | Barney | 310/211 |
| 3,134,040 | A * | 5/1964 | Barth | 310/211 |
| 3,488,532 | A * | 1/1970 | Anderson et al. | 310/58 |
| 3,521,098 | A * | 7/1970 | Jesse | 310/163 |
| 3,688,141 | A * | 8/1972 | Maslennikov et al. | 310/211 |
| 3,743,873 | A * | 7/1973 | de Jong | 310/165 |
| 3,902,087 | A * | 8/1975 | Hakamada et al. | 310/211 |
| 4,095,627 | A * | 6/1978 | Lonseth et al. | 141/250 |
| 4,249,098 | A * | 2/1981 | Karlen et al. | 310/183 |
| 4,939,398 | A * | 7/1990 | Lloyd | 310/156.53 |
| 5,304,877 | A * | 4/1994 | Baek | 310/45 |
| 5,512,792 | A * | 4/1996 | Bawin et al. | 310/262 |
| 5,642,010 | A * | 6/1997 | Carosa et al. | 310/211 |
| 5,698,929 | A * | 12/1997 | Seki et al. | 310/323.03 |
| 5,719,457 | A * | 2/1998 | Helfer | 310/211 |
| 5,869,915 | A * | 2/1999 | Blake | 310/182 |
| 5,886,443 | A * | 3/1999 | Dymond et al. | 310/196 |
| 6,022,637 | A * | 2/2000 | Wilson | 429/112 |
| 6,177,750 | B1 * | 1/2001 | Tompkin | 310/261 |
| 6,380,655 | B1 * | 4/2002 | Ide et al. | 310/211 |
| 7,019,428 | B2 * | 3/2006 | Sato | 310/211 |
| 2004/0012293 | A1 * | 1/2004 | Kuemmlee et al. | 310/211 |
| 2004/0113508 | A1 * | 6/2004 | Yasuhara et al. | 310/211 |
| 2005/0134137 | A1 * | 6/2005 | Sweo | 310/211 |
| 2006/0267441 | A1 * | 11/2006 | Hang et al. | 310/211 |

FOREIGN PATENT DOCUMENTS

JP          10234166 A  *  9/1998

* cited by examiner

*Primary Examiner*—Dang Le
(74) *Attorney, Agent, or Firm*—Thompson Coburn LLP

(57) ABSTRACT

In accordance with one embodiment, the present technique provides a bushing that is configured to electrically and mechanically couple a conductor bar of a rotor assembly to an end ring of the rotor assembly. The exemplary bushing has an interior surface that is configured to abut against the conductor bar and an exterior surface that is configured to abut the perimetric surface of an end slot. Advantageously, the bushing, because of a good fit in the end slot and around the conductor bar, provides a good electrical connection between the conductor bar and the end ring. Moreover, the exemplary bushing also provides interferences fits that at least partially secure the end ring to the rotor core.

32 Claims, 4 Drawing Sheets

HIGH MECHANICAL STRENGTH ELECTRICAL CONNECTION SYSTEM AND METHOD

BACKGROUND

The present technique relates generally to the field of electric motors and particularly to rotors for induction motors, such as a fabricated squirrel cage rotor, for example.

Electric motors of various types are commonly found in industrial, commercial and consumer settings. In industry, such motors are employed to drive various kinds of machinery, such as pumps, conveyors, compressors, fans and so forth, to mention only a few. Conventional alternating current (ac) electric motors may be constructed for single- or multiple-phase power and are typically designed to operate at predetermined speeds or revolutions per minute (rpm), such as 3600 rpm, 1800 rpm, 1200 rpm and so on. Such motors generally include a stator comprising a multiplicity of windings surrounding a rotor, which is supported by bearings for rotation in the motor frame. Typically, the rotor comprises a core formed of a series of magnetically conductive laminations arranged to form a lamination stack caped at each end by electrically conductive end rings. Additionally, typical rotors include a series of conductors that are formed of a nonmagnetic, electrically conductive material and that extend through the rotor core. These conductors are electrically coupled to one another via the end rings, thereby forming one or more closed electrical pathways.

In the case of ac motors, applying ac power to the stator windings induces a current in the rotor, specifically in the conductors. The electromagnetic relationships between the rotor and the stator cause the rotor to rotate. The speed of this rotation is typically a function of the frequency of ac input power (i.e., frequency) and of the motor design (i.e., the number of poles defined by the stator windings). A rotor shaft extending through the motor housing takes advantage of this produced rotation and translates the rotor's movement into a driving force for a given piece of machinery. That is, rotation of the shaft drives the machine to which it is coupled.

Often, design parameters call for relatively high rotor rotation rates, i.e., high rpm. By way of example, a rotor within an induction motor may operate at rates as high as 10,000 rpm, and beyond. Based on the diameter of the rotor, operation at such rpm translates into relatively high surface speeds on the rotor. Again, by way of example, these rotor surface speeds can reach values of 100 meters per second (mps), and beyond. During operation, particularly during high-speed operation, produced centripetal and centrifugal forces strain various components of the rotor assembly. For example, if not properly accounted for, the centripetal and centrifugal forces developed in the end ring may cause the end ring to prematurely malfunction. Moreover, these centripetal and centrifugal forces may, over time, negatively affect the mechanical integrity of the rotor, leading to a lessening of performance and, in certain instances, failure of the motor. Undeniably, loss of performance and motor failure are events that can lead to unwanted costs and delays.

In traditional motors, the end ring and the electrical conductors extending through the rotor core are mechanically and electrically coupled via a brazing process By way of example, the conductor and the end ring may be brazed together using a hard brazing rod with a high melting point. Unfortunately, heat generated during a brazing process can negatively affect the material of the end rings and/or the conductor. For example, developed heat can cause annealing in the end rings and/or conductors. In turn, such annealing reduces the yield strength of the annealed material, thereby increasing the likelihood of damage due to centripetal and centrifugal forces within the rotor, for instance.

There exists a need, therefore, for a method and apparatus for improved rotor construction and integrity.

BRIEF DESCRIPTION

According to one exemplary embodiment, the present technique provides a bushing for use with a motor rotor. The exemplary bushing includes a body that has an interior section, which is configured to receive a portion of a conductive member, and an exterior section. In the exemplary bushing, the interior section abuts the conductive member, and the exterior section abuts the end slot of an end member. Accordingly, the exemplary body at least partially secures the end member to the rotor core and electrically couples the conductive member to the end member. Advantageously, the exemplary bushing facilitates a mechanical connection between the end member and conductive member that secures the end member to the rotor core. Moreover, the securing member electrically couples the conductive member to the end member. Accordingly, the exemplary securing member facilitates electrical and mechanical connections of various components of the rotor without the introduction of relatively high amounts of heat, for instance.

In accordance with another embodiment, the present technique provides a rotor for an electric motor. The rotor comprises a rotor core, which includes a plurality of rotor slots extending therethrough, and first and second end members disposed on opposite ends of the rotor core. In the exemplary rotor, each end member has a plurality of end slots that extend therethrough. These end slots cooperate with the rotor slots to define a plurality of rotor channels that extend through both the rotor core and the first and second end members. These exemplary rotor channels each supports a conductive member, which is disposed in and extends through the rotor channel. To mechanically secure the end members with respect to the rotor core, and to electrically couple the conductive members to the end member, the exemplary rotor includes securing members that are disposed in each of the end slots and at least partially about a conductive member. Accordingly, the exemplary securing member forms an interference fit in cooperation with the conductive member and in cooperation with the end slot of the end member, thereby mechanically securing the end member to the rotor core and electrically coupling the conductive member to the end member. Advantageously, the exemplary securing member facilitates retention of the mechanical integrity of the conductive member and the end member that, by way of example, may be lost due to heat produced during a brazing process, for instance. In turn, retention of the mechanical integrity of the various rotor components facilitates an increase in the integrity of the rotor during high speed operation and, as such, reduces the likelihood of failure due to centripetal and centrifugal forces produced during operation, for instance. In other words, the exemplary embodiments facilitate the construction of a more robust rotor and motor.

In accordance with another exemplary embodiment, the present technique provides a method of manufacturing a rotor. The method includes the act of aligning an end member with a rotor core such that a rotor slot extending through the rotor core cooperates with an end slot in the end member to form a rotor channel that extends through the rotor core and the end member. The exemplary method also includes disposing a conductive member in the rotor channel. Additionally, the exemplary method includes disposing a securing member in the end slot and at least partially about the conductive member such that the securing member electrically couples the end member and the conductive member. Advantageously, the exemplary securing member abuts against the end slot and the conductive member, thereby creating a pair of interference fits. These interference fits, in the exemplary method, mechanically secure the end member to the rotor core.

DRAWINGS

These and other features, aspects and advantages of the present technique will become better understood when the following detailed description is read with reference to the accompanying drawings in which like characters represent like parts throughout the drawings, wherein.

DETAILED DESCRIPTION

As discussed in detail below, embodiments of the present technique provide apparatus and methods related to rotors for induction motors. Although the following discussion focuses on induction motors, the present technique also affords benefits to a number of applications in which rotor integrity and design is a concern. Indeed, the present technique is applicable to induction generators, among other types of device constructions. Accordingly, the following discussion provides exemplary embodiments of the present technique and, as such, should not be viewed as limiting the appended claims to the embodiments described.

Additionally, as a preliminary matter, the definition of the term "or" for the purposes of the following discussion and the appended claims is intended to be an inclusive "or." That is, the term "or" is not intended to differentiate between two mutually exclusive alternatives. Rather, the term "or" when employed as a conjunction between two elements is defined as including one element by itself, the other element itself, and combinations and permutations of the elements. For example, a discussion or recitation employing the terminology "'A' or 'B'" includes: "A" by itself, "B" by itself, and any combination thereof, such as "AB" and/or "BA."

Figure 1:
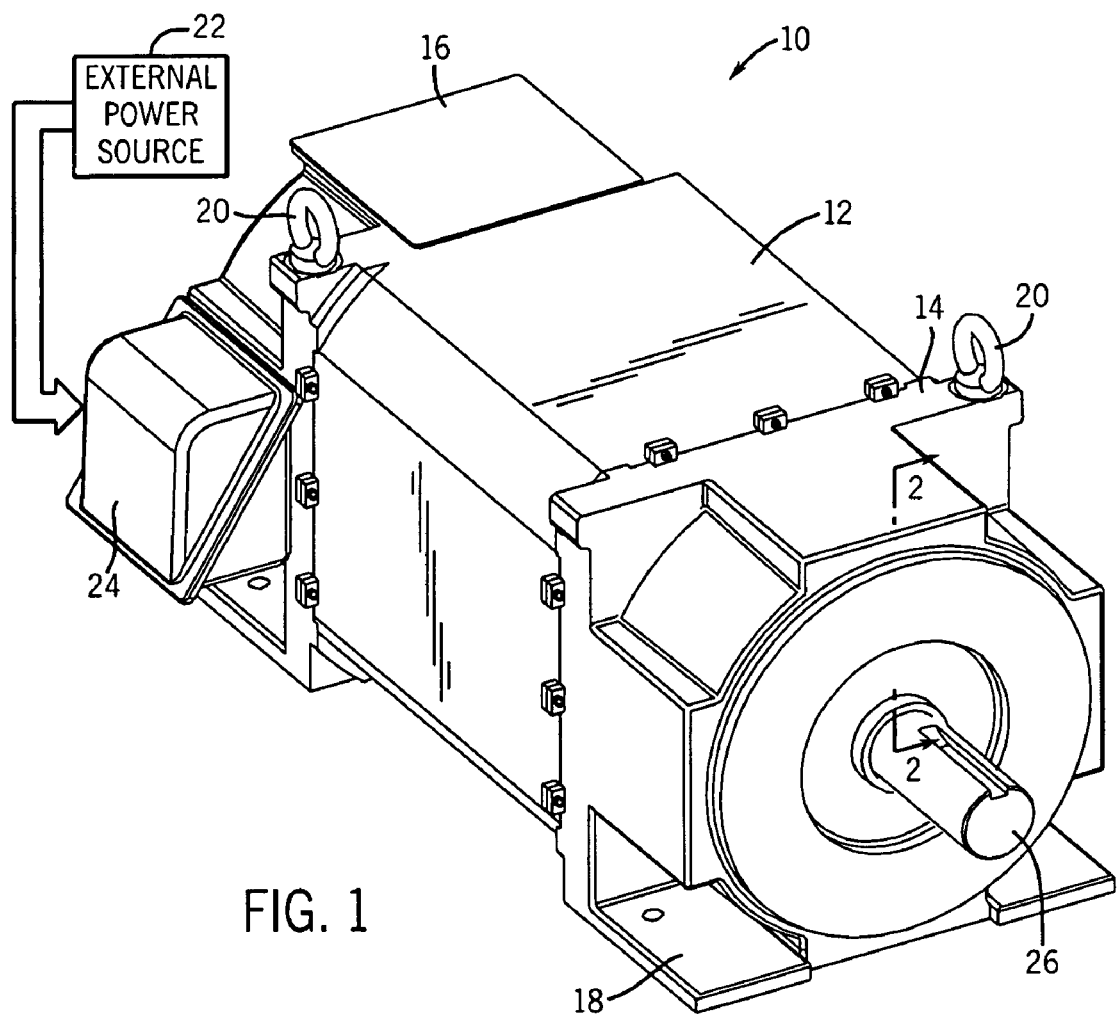
FIG. 1 is a perspective view of an induction motor, in accordance with an embodiment of the present technique.

Turning to the drawings, FIG. 1 illustrates an exemplary electric motor 10. The exemplary motor 10 is an induction motor housed in a motor housing and includes a frame 12 capped at each end by end caps 14 and 16, respectively. The frame 12 and the endcaps 14 and 16 may be formed of various materials, such as cast iron, steel, aluminum or any other suitable structural material. Advantageously, the end caps 14 and 16 may include mounting and transportation features, such as the illustrated mounting feet 18 and eyehooks 20. Those skilled at the art will appreciate in light of the following description that a wide variety motor configurations and devices may employ the techniques outlined below.

To induce rotation of the exemplary rotor, current is routed through stator windings 32 disposed in the stator. (See FIG. 2.) These stator windings are electrically interconnected to form groups, which are, in turn, interconnected in a manner generally known in the pertinent art. The stator windings are further coupled to terminal leads, which electrical connect the stator windings to an external power source 22. By way of example, the external power source 22 may comprise an ac pulse with modulated (PWM) inverter. As yet another example, the external power source 22 may comprise a single-phase or a three-phase ac power source. In any event, a conduit box 24 houses the electrical connection between the terminal leads and the external power source 22 for the exemplary motor 10. The exemplary conduit box 24 is formed of metal or plastic material and, advantageously, provides access to certain electrical components of the motor 10.

When electrical current from the external power source 22 is routed through the stator windings, a magnetic field that induces rotation of the rotor is produced. Specifically, a magnetic field is produced and, resultantly, current is induced the rotor bars 44 (see FIG. 3). This induced current generates another magnetic field, and the interaction between these magnetic fields causes rotation of the rotor. A rotor shaft 26, which is coupled to the rotor, rotates in conjunction with the rotor. That is, rotation of the rotor translates into a corresponding rotation of the rotor shaft 26. To support and facilitate rotation of the rotor and the rotor shaft 26, the exemplary motor 10 includes bearing sets that are carried within the end caps 14 and 16, respectively. (See FIG. 2.) As will be appreciated by those of ordinary skill in the art, the rotor shaft 26 may couple to any number of drive machine elements, thereby transmitting torque to the given drive machine element. By way of example, machines such as pumps, compressors, fans, conveyers and so forth, may harness the rotational motion of the rotor shaft 26 for operation.

Figure 2:
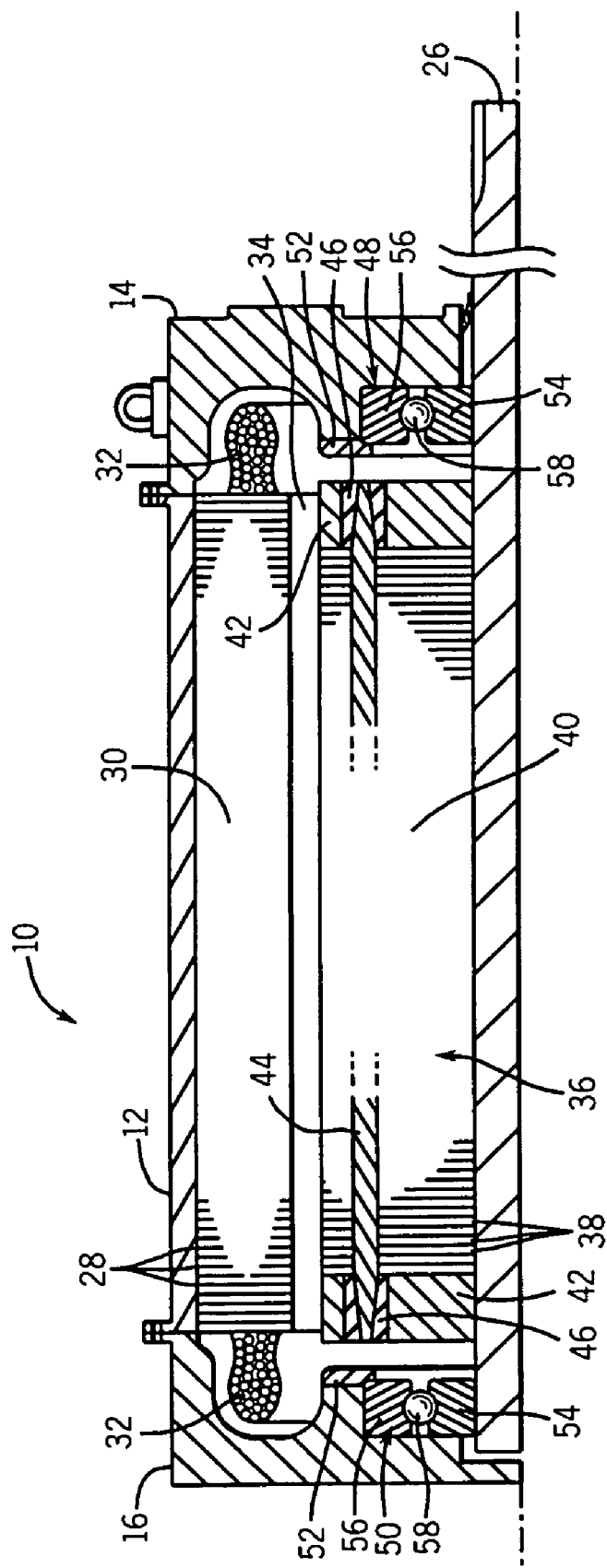
FIG. 2 is a partial cross-sectional view of the motor of FIG. 1 along line 2-2.

FIG. 2 provides a partial cross-section view of the exemplary motor 10 of FIG. 1 along line 2-2. For the sake of simplicity, only the top portion of the motor is illustrated, as the structure of the exemplary motor 10 is essentially mirrored along it's centerline. The exemplary motor 10 includes a plurality of stator laminations 28 that are juxtaposed and aligned with respect to one another to form a stator core 30. Each exemplary stator lamination 28 includes features that cooperate with features of adjacent stator laminations 28 to form cumulative features that extend the length of the stator core 30. For example, each stator lamination 28 has an aperture the extends through the lamination and that cooperates with apertures of adjacent stator laminations form slots that extend the length of the stator core 30 and that are configured to receive one or more turns of a coil winding, which are illustrated as coil ends 32 in FIG. 2. Each stator lamination 28 also has a central aperture, which, when aligned with the central apertures of adjacent stator laminations 28, forms a contiguous rotor chamber 34 that extends through the stator core 30.

In the exemplary motor 10, a rotor 36 resides within this rotor chamber 34. Similar to the stator core 30, the exemplary rotor 36 is formed of a plurality of rotor laminations 38 that are aligned and adjacently placed with respect to one another. Thus, the rotor laminations 38 cooperate to form the contiguous rotor core 40. The exemplary rotor 36 also includes end members, such as the illustrated end rings 42, that are disposed on opposite ends of the rotor core 40. These end rings 42 cooperate with other components to secure the rotor laminations 38 with respect to one another, as discussed further below. The exemplary rotor 36 also includes electrically conductive members, such as the illustrated conductor bars 44, that extend the length of the rotor 36. In the exemplary motor 10, the end rings 42, in cooperation with securing members 46 disposed in end slots (see FIG. 3) of the end rings 42, electrical couple the conductor bars to the end ring 42 and, as such, one another. To facilitate electrical communications, the exemplary conductor bars 44, the exemplary end rings 42 and the exemplary securing members 46 are formed of non-magnetic, yet electrically conductive materials. Indeed, the conductor bars 44 and the exemplary end rings 42 and/or the securing members 46 may be formed of a high-strength material, thereby facilitating use in higher stress applications.

To support the rotor 36 and the rotor shaft 26, the exemplary motor 10 includes bearing sets 48 and 50 that are each disposed in the respective end caps 14 and 16 and that are each secured to the rotor shaft 26. The exemplary bearings sets 48 and 50 facilitate rotation of the rotor shaft 26 and rotor 36 within the stator core 30. By way of example, the exemplary bearing sets 48 and 50 have a ball bearing construction; however, the bearing sets 48 and 50 may have a sleeve bearing construction, among other types of bearing constructions. Advantageously, the end caps 14 and 16 include features, such as the illustrated inner bearing caps 52 that secure the bearing sets 48 and 50 within their respective end caps 14 and 16. These exemplary inner bearing caps 52 include fasteners, such as bolts or other types of suitable fasteners, that are releasibly secured to the end caps 14 and 16. The bearing sets 48 and 50 receive and transfer the radial and thrust loads produced by the rotor shaft 26 and the rotor 36 during operation of the motor to the motor housing, i.e., the frame 12 and the end caps 14 and 16.

Each exemplary bearing set 48 and 50 includes an inner race 54 disposed circumferentially about the rotor shaft 26. The fit between the inner races 54 and the rotor shaft 26 causes the inner races 54 of each bearing set to rotate in conjunction with the rotor shaft 26. Each exemplary bearing set 48 and 50 also includes an outer race 56 and rolling elements 58, which are disposed between the inner race 54 and the outer race 56. The rolling elements 58 facilitate rotation of the inner races 54, while the outer races 56 remain stationarlily mounted with respect to the end caps 14 and 16. Thus, the bearing sets 48 and 50 facilitate rotation of the rotor shaft 26 and the rotor 36 and provide a support structure for the rotor 36 and rotor shaft 26 within the motor housing. In the exemplary motor 10, a lubricant coats the rolling elements 58 and races 54 and 56 of each bearing set 48 and 50, thereby providing a separating film between the various components of the bearing sets. Advantageously, this lubricant mitigates the likelihood of seizing, galling, welding, excessive friction and/or excessive wear, to name but a few adverse effects.

Figure 3:
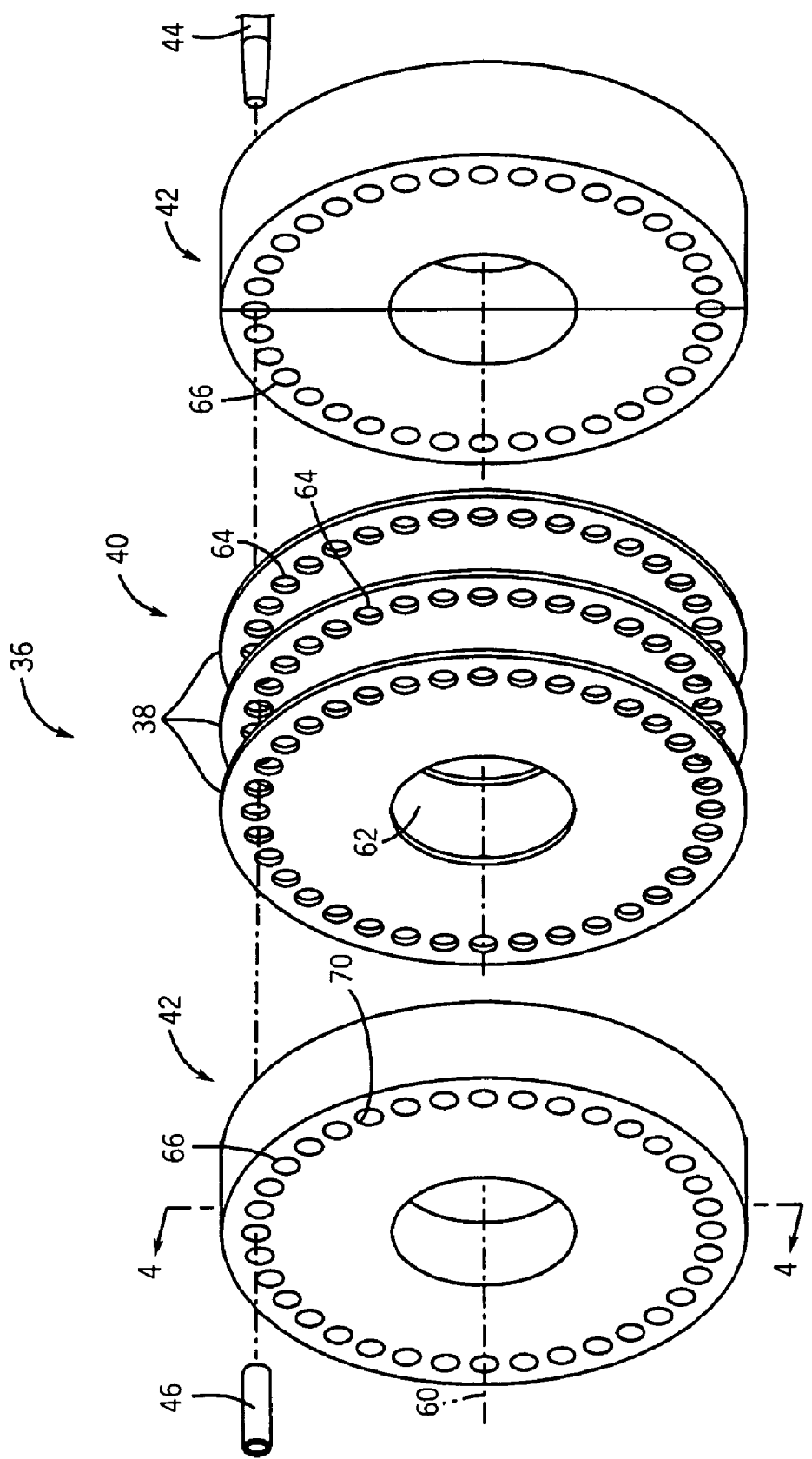
FIG. 3 is an exploded perspective view of a rotor, in accordance with an embodiment of the present technique.

FIG. 3 presents an exploded view of an exemplary rotor 36, which includes a series of rotor laminations 38 disposed between a pair of end rings 42. To maintain symmetry, the rotor laminations 38 and the end rings 42 are disposed concentrically along an axial centerline 60 of the rotor 36. That is, the axial centerline 60 of the rotor 36 passes through the center of each of the end rings 42 and each of the rotor laminations 38. Accordingly, the axial centerline 60 defines an axis of rotation for the assembled rotor 36.

Focusing on the exemplary rotor laminations 38, each rotor lamination 38 presents a generally circular cross-section and is formed of a magnetically conductive material, such as an electrical steel. Extending from end-to-end, i.e., transverse to the cross-section, each rotor lamination 38 includes features that cooperate with corresponding features of adjacent rotor laminations 38 to form cumulative features that extend the length of the rotor core 40. For example, each rotor laminations 38 has a circular shaft aperture 62 that is located in the center of the rotor lamination 38 and that extends from end-to-end. The shaft apertures 60 of adjacent rotor laminations 38 cooperate to form a shaft chamber configured to receive the rotor shaft 26 (See FIG. 2) therethrough. Additionally, each rotor lamination 38 has a series of rotor slots 64 that are concentrically arranged with respect to one another and about the centerline 60. In the illustrated rotor laminations 38, thirty-six rotor slots 64 are arranged in a slot pattern and are at equiangular and symmetric positions with respect to one another. As will be appreciated by one of ordinary skill in the art in view of this discussion, other slot patterns and arrangements may also be envisaged. For example, the rotor laminations 38 may have twenty-four rotor slots that are arranged in any number of configurations. When the rotor laminations 38 are assembled with respect to one another the rotor slots cooperate to form rotor channels (See FIG. 2) that extend through the rotor core 40. These rotor channels are configured to receive electrically conductive and non-magnetic members (i.e., conductor bars 44) therethrough.

Figure 4:
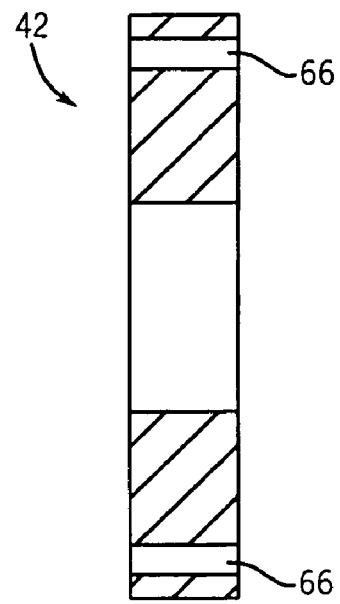
FIG. 4 is a cross-sectional view of an end member of the rotor of FIG. 3 along line 4-4.

The end rings 42, which are disposed on opposite ends of the rotor core 40, also present features that are advantageous to the rotor 36. For example, each exemplary end ring 42 has a series of end slots 66 that are arranged concentrically with respect to one another and that extend through the end ring 42. (See FIG. 4). As illustrated, each exemplary end ring 42 has thirty-six end slots 66 that are arranged in a slot pattern that corresponds with the slot pattern of the rotor laminations 38. Accordingly, when aligned and assembled, the end slots 66 and the rotor slots 64 cooperate to define a plurality of rotor channels (see FIG. 2) that extend through the rotor core 40 and the end rings 42 and that receive the conductor bars 44 therethrough. (See FIG. 2.)

Figure 5:
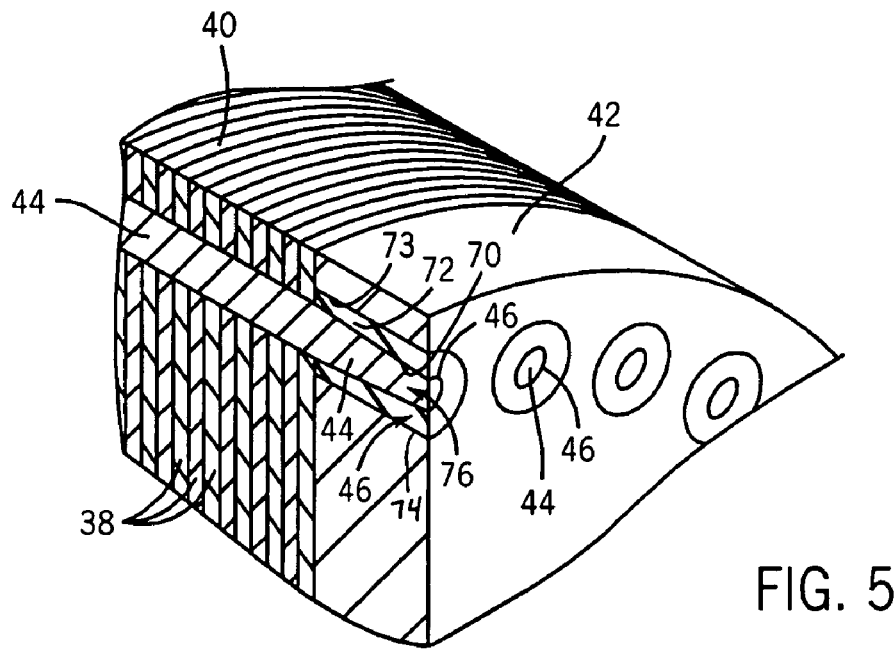
FIG. 5 is a detail, perspective and cross-sectional view of a portion of rotor assembly, in accordance with an embodiment of the present technique.

As illustrated in FIG. 5, the end rings 42 are secured to the rotor core 40 by exemplary securing members 46 that are each disposed in an end slot 66 and circumscribed about a conductive member 44. In the exemplary embodiment, each securing member 46 has a cylindrical body that includes an inner surface 70 that abuts against the conductor bar 44 and an outer surface 72 that abuts against the perimetric surface 73 of the end slot 66. However, as will be appreciated for those of ordinary skill in the art in view of the present description, the securing member 46 may present a number of shapes and profiles. For example, the body need not be limited to a cylindrical shape. Additionally, the body may comprise a single piece in abutment with both the conductor bar 44 and the end slot 66 or may comprise an assembly of pieces that abuts the conductor bar 44, in turn, the perimeter of the end slot 66.

The securing members 46, by way of example, establish a series of interference fits between the inner surface 72 and the conductor bar 44 as well as between the outer surface 74 and the perimetric surface 73 of the end slot 66. In turn, these interference fits, in cooperation with interference fits on the opposite end ring 42, restrict movement of the end rings 42 with respect to the rotor core 40 and, as such, secure the end rings 42 to the rotor core 40. Additionally, the abutment of the exemplary securing member 46 with the conductor bar 44 and the end ring 42 facilitates electrical conductivity between the end ring 42 and the conductor bar 44. That is, the exemplary securing member 46 electrically couples the conductor bar 44 to the end ring 42, and, in turn, electrically couples the conductor bars 44 to one another. Advantageously, the interference fits provide a mechanical connection between the conductor bars 44 and the end ring 42, thereby electrically and physically connecting the end members and conductor bars 44 with respect to one another without affecting the material properties of either structure. To help facilitate the engagement between the securing members 46 and the conductor bars 44, the interior surface 70 of the exemplary securing member 46 tapers in a manner corresponding to the tapered end 76 of the conductor bar 44.

In the exemplary embodiment, the securing member 46 is formed of a malleable and electrically conductive material, such as copper. As one example, the securing member 46 is formed of a copper having a hardness of H0 (as measured in accordance with the standards of the American Society for Testing and Material or ASTM). The securing member 46 may have a hardness rating (i.e., lower yield strength) than the conductors bars 44, because the securing members 46 are sandwiched between the conductor bars 44 and the end slots 66 and, as such, receive support from these elements of the rotor assembly. Advantageously, the malleability of the securing members 46 facilitates the correction of manufacturing errors and increases acceptable tolerances with respect to the conductor bars 44 and the end members 42 (e.g., end slots 66). In other words, the malleable material of the securing members 46 accommodates for dimensional discrepancies between the planned and manufactured components of the rotor, for instance. As an additional benefit, using a material with lower yield strength for the securing members 46, as compared to the conductor bars 44, can facilitate a reduction in manufacturing costs, for example.

Figure 6:
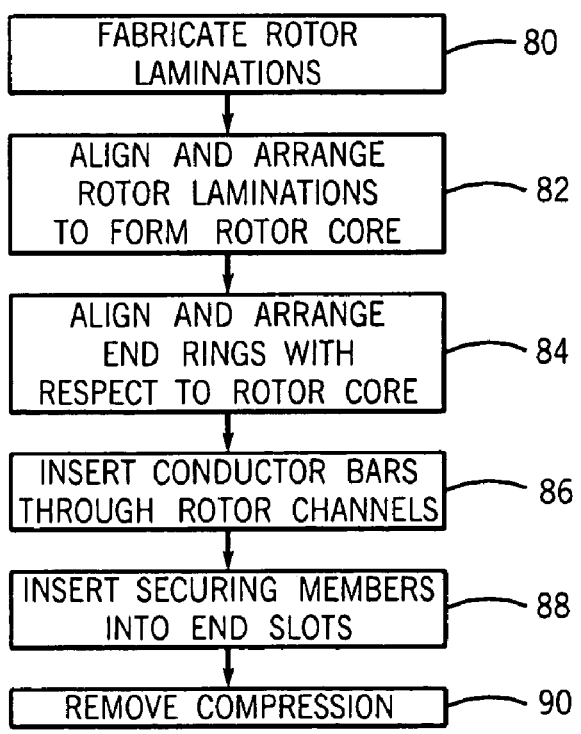
FIG. 6 is a flow chart representative of an exemplary process for manufacturing a rotor, in accordance with an embodiment of the present technique.

With FIGS. 1-5 in mind, FIG. 6 diagrammatically illustrates an exemplary process for manufacturing a rotor in accordance with an embodiment of the present technique. The exemplary process includes the act of fabricating the rotor laminations 38, as is represented by block 80. By way of example, the rotor laminations 38 may be fabricated via a stamping process, in which a pattern is stamped on a thin sheet of metal blank (e.g., lamination). The exemplary process also includes the act of aligning and arranging the laminations with respect to one another, as represented by block 82. Once aligned, the rotor laminations 38 cooperate to form the cumulative features of the rotor core 40, such as shaft chamber discussed above. While the rotor laminations are maintained under compression, end rings members 42 are aligned and arranged with respect to the rotor core 40, as represented by block 84. Once aligned, the end slots 66 of the end rings 42 cooperate with the rotor slots 64 to form rotor channels that extend the length axial length of the rotor assembly. As represented by block 86, the exemplary process also includes the act of disposing the conductor bars 44 into to rotor channels. To secure the end rings 42 to the rotor core 40, securing members 46 are inserted into the end slots 66 and about the conductor bars 44, as represented by block 88 of the exemplary process. The securing members 46, in the exemplary process, are inserted using mechanical assistance, such as a hydraulic press, for example. Upon insertion, the exemplary securing members 46 create interference fits in cooperation with the end slot 66 and the conductor bars 44, thereby mechanically coupling the end rings 42 to the rotor core 40 and electrically coupling the end rings 42 to the conductor bars 44 and, as such, the conductors bars 44 to one another. Indeed, the inner surface 72 of the retaining member establishes interference fits with the conductor bar 44, and the outer surface 74 establishes interference fits with the perimetric surface 73 of the end slot 66. These fits are formed as the retaining member 46 is axially pressed into engagement with the tapered male end 76 of the conductor bar 44. These interference fits provide the mechanical and electrical coupling for the various components of the rotor and, as such, mitigate the need for the introduction of heat, which is typically used for a brazing process and which can negatively impact structural properties of the rotor. Because the securing members 46 retain the end rings 42 in position with respect to the rotor core 40, the external compression is removed, as represented by block 90 of the exemplary process.

While only certain features of the technique have been illustrated and described herein, many modifications and changes will occur to those skilled in the art. It is, therefore, to be understood that the appended claims are intended to cover all such modifications and changes as fall within the true spirit of the technique.

The invention claimed is:

1. A rotor for an electric motor, comprising:
   a rotor core having a plurality of rotor slots extending through the rotor core;
   first and second end members disposed at opposite ends of the rotor core, each end member having a plurality of end slots cooperative with the rotor slots to define a plurality of rotor channels extending through the rotor core and the first and second end members;
   a plurality of electrically conductive members disposed in the plurality of rotor channels; and
   a plurality of securing members, each securing member being disposed in an end slot of an end member and at least partially about a conductive member to electrically couple the conductive member to the end member;
   wherein each securing member comprises:
      an interior section dimensioned to receive the conductive member with a press fit to solely secure the conductive member to the securing member, and
      an exterior section dimensioned to be press fit in the end slot to solely secure the securing member to the end member.

2. The rotor as recited in claim 1, wherein the plurality of securing members electrically couples the plurality of conductive members to one another.

3. The rotor as recited in claim 1, wherein the conductive member comprises a material having a higher yield strength value than that of the corresponding securing member.

4. The rotor as recited in claim 1, wherein the interior section comprises at least one arcuate surface.

5. The rotor as recited in claim 1, wherein each conductive member has an end portion that tapers with respect to a longitudinal axis of the conductive member.

6. The rotor as recited in claim 5, wherein each securing member has an interior section that tapers with respect to a longitudinal axis of the securing member, such that the tapers of the end portion and the interior section correspond with one another.

7. The rotor as recited in claim 1, wherein the plurality of securing members comprises copper or aluminum.

8. A rotor for use with an electric motor, comprising:
   a rotor core comprising a plurality of rotor laminations and having a generally circular core cross-section and a plurality of rotor slots extending through the rotor core generally transverse to the core cross-section;
   first and second end members disposed at opposite ends of the rotor core, each end member having a plurality of end slots cooperative with the plurality of rotor slots to define a plurality of rotor channels extending through the rotor core and the first and second end members;
a plurality of electrically conductive members disposed in the plurality of rotor channels; and
a plurality of securing members dimensioned for an interference fit in cooperation with the plurality of conductive members and the plurality of end slots to at least partially secure the end members with respect to the rotor core, wherein the plurality of securing members electrically couples the end members and the plurality of conductive members to one another.

9. The rotor as recited in claim 8, wherein at least one of the plurality of securing members and the plurality of conductive members comprises copper.

10. The rotor as recited in claim 8, wherein the plurality of conductive members has a yield strength value greater than the yield strength value of the plurality of securing members.

11. The rotor as recited in claim 8, wherein the plurality of securing members, plurality of conductive members, and the first and second end members cooperate to establish at least one closed electrical pathway.

12. The rotor as recited in claim 8, wherein at least one of the first and second end members has a yield strength value greater than the yield strength value of the plurality of securing members.

13. An electric motor, comprising:
a stator core having a rotor chamber extending therethrough, the stator core including a plurality of stator windings configured to receive power from a power source; and
a rotor disposed in the rotor chamber, the rotor comprising:
  a rotor core having a plurality of rotor slots extending through the rotor core;
  first and second end members disposed at opposite ends of the rotor core, each end member having a plurality of end slots cooperative with the plurality of rotor slots to define a plurality of rotor channels extending through the rotor core and the first and second end members;
  a plurality of electrically conductive members disposed in the plurality of rotor channels; and
  a plurality of securing members each disposed in an end slot of an end member and at least partially about a conductive member to electrically couple the end member to the conductive member;
  wherein the securing members are dimensioned for an interference fit with the conductive members and the end slots to at least partially secure the end members with respect to the rotor core.

14. The electric motor as recited in claim 13, wherein the power source comprises an alternating current (ac) power source.

15. The electric motor as recited in claim 14, wherein the power source comprises a pulse width modulated (PWM) power source.

16. The electric motor as recited in claim 14, wherein the power source comprises a three-phase power source.

17. The electric motor as recited in claim 13, comprising the power source.

18. The electric motor as recited in claim 13, wherein the rotor core comprises a plurality of rotor laminations.

19. The electric motor as recited in claim 13, wherein the rotor is configured for high-speed operation.

20. An electric motor, comprising:
an enclosure comprising first and second end caps and a frame disposed between the end caps;
a stator core disposed in the enclosure, the stator core including a plurality stator windings configured to receive power from a power source and comprising a plurality of stator laminations configured to cooperate with one another to form a rotor chamber extending axially through the rotor core; and
a rotor disposed in the rotor chamber, comprising:
  a rotor core comprising a plurality of rotor laminations and having a plurality of rotor slots extending through the rotor core;
  first and second end members disposed at opposite ends of the rotor core, each end member having a plurality of end slots cooperative with the rotor slots to define a plurality of rotor channels extending through the rotor core and the first and second end members;
  a plurality of electrically conductive members disposed in the plurality of rotor channels; and
  a plurality of securing members each dimensioned for an interference fit with a conductive members and an end slot to at least partially secure the end member with respect to the rotor core to electrically couple the end member to the conductive member.

21. The electric motor as recited in claim 20, wherein the plurality of securing members comprises a malleable material.

22. The electric motor as recited in claim 20, wherein the plurality of securing members comprises a material having a lower yield strength value than the yield strength value of the plurality of conductive members or the end members.

23. The electric motor as recited in claim 20, wherein the rotor is configured for high-speed operation.

24. The electric motor as recited in claim 20, wherein the power source comprises an alternating current (ac) power source.

25. The electric motor as recited in claim 20, wherein the power source comprises a pulse width modulated (PWM) inverter.

26. The electric motor as recited in claim 20, comprising the power source.

27. A rotor for an electric motor, comprising:
a rotor core having a plurality of rotor slots extending through the rotor core;
first and second end members disposed at opposite ends of the rotor core, each end member having a plurality of end slots cooperative with the rotor slots to define a plurality of rotor channels extending through the rotor core and the first and second end members;
a plurality of electrically conductive members disposed in the plurality of rotor channels; and
a plurality of bushings securing and electrically coupling the conductive members to the end members, the bushings each having an interior section receiving and abutting a portion of the conductive member and an exterior section fitting into and abutting the end slot of the end member.

28. The rotor of claim 27, wherein the bushings solely secure the conductive members to the end members.

29. The rotor of claim 27, wherein the bushings electrically couple the conductive members to the end members.

30. The rotor of claim 27, wherein the interior sections of the bushings taper with respect to the longitudinal axis of the bushings.

31. The rotor of claim 27, wherein the bushings comprise a material having a yield strength lower than a yield strength of a material comprising the conductive members.

32. The rotor of claim 27, wherein the bushings comprise a malleable material.

* * * * *